United States Patent [19]
Kim

[11] Patent Number: 5,603,823
[45] Date of Patent: Feb. 18, 1997

[54] LA/ND-SPINEL COMPOSITIONS FOR METALS PASSIVATION IN FCC PROCESSES

[75] Inventor: Gwan Kim, Columbia, Md.

[73] Assignee: W. R. Grace & Co.-Conn., New York, N.Y.

[21] Appl. No.: 440,281

[22] Filed: May 12, 1995

[51] Int. Cl.⁶ .................................................. C10G 11/02
[52] U.S. Cl. ........................................... 208/113; 208/120
[58] Field of Search ................................. 502/521, 524; 208/113, 120

[56] References Cited

U.S. PATENT DOCUMENTS

| | | | |
|---|---|---|---|
| 4,239,656 | 12/1980 | Fujitani et al. | 502/524 |
| 4,497,902 | 2/1985 | Bertolacini et al. | 502/65 |
| 4,515,903 | 5/1985 | Otterstedt et al. | 502/521 |
| 4,735,705 | 4/1988 | Burk, Jr. et al. | 502/524 |
| 4,889,615 | 12/1989 | Chin et al. | 208/113 |
| 4,912,078 | 3/1990 | Kriggsman | 502/524 |
| 4,921,824 | 5/1990 | Chineld | 502/521 |
| 5,057,205 | 10/1991 | Chin et al. | 208/121 |
| 5,258,347 | 11/1993 | Khazai et al. | 502/524 |
| 5,288,675 | 2/1994 | Kim | 502/65 |
| 5,304,299 | 4/1994 | Kumar | 208/120 |
| 5,324,416 | 6/1994 | Cormier et al. | 208/113 |
| 5,364,517 | 11/1994 | Dieckmann et al. | 502/524 |
| 5,399,327 | 3/1995 | Kim | 423/244.11 |
| 5,407,878 | 4/1995 | Kim | 502/41 |
| 5,426,083 | 6/1995 | Bhattacharyya | 502/411 |

FOREIGN PATENT DOCUMENTS

| | | |
|---|---|---|
| 0110703 | 6/1984 | European Pat. Off. |
| 8706156 | 10/1987 | WIPO |
| 9419427 | 9/1994 | WIPO |

Primary Examiner—Helane Myers
Attorney, Agent, or Firm—Steven Capella

[57] ABSTRACT

Catalytic cracking catalysts and additives which comprise a metals passivation component containing:

15–60 parts by weight MgO,
30–60 parts by weight $Al_2O_3$, and
10–30 parts by weight rare earth compound selected from the group consisting of La oxide, Nd oxide, and mixtures thereof, wherein at least a portion of the MgO and $Al_2O_3$ are in the form of an Mg—Al oxide spinel, are especially useful for catalytic cracking processes involving hydrocarbon feedstocks containing high metals (e.g. vanadium) content. The La/Nd compound may be one which forms La and/or Nd oxide during the FCC process cracking or regeneration step.

14 Claims, 1 Drawing Sheet

LA/ND-SPINEL COMPOSITIONS FOR METALS PASSIVATION IN FCC PROCESSES

BACKGROUND OF THE INVENTION

Poisoning (or deactivation) of fluid catalytic cracking (FCC) catalysts is a persistent problem especially as petroleum refiners often work with hydrocarbon feedstocks which contain substantial amounts of vanadium and/or nickel. Premature catalyst deactivation leads to added refining cost both in terms of the amount of catalyst consumed and in terms of down time for the refinery.

In the past, various additives have been proposed to passivate poisoning metals such that their deactivating effect is lessened. Examples of compositions which have been proposed for this purpose include magnesium aluminate spinel (U.S. Pat. No. 5,057,205), hydrotalcite (U.S. Pat. No. 4,889,615), rare earth compounds in clay/alumina matrix (U.S. Pat. No. 5,304,299), rare earth compounds in acid-reacted metakaolin matrix (U.S. Pat. No. 5,248,642), co-precipitated non-spinel ternary oxides (U.S. Pat. No. 5,407,878), etc.

In general, the use of any additive may present issues for the refiner in practice. The additive content in the catalyst inventory may require separate monitoring. Additives may cause the creation of undesired effluents in the regenerator. Additives may require or create altered conditions in the FCC unit. Additives are often more expensive than the cracking catalyst itself. Thus, it is often desired to minimize the amount and/or number of additives used.

While known metals passivation additives often produce satisfactory results, there is a continued need for improved additives for metals passivation, especially additives which are more suitable for manufacture on a commercial scale.

SUMMARY OF THE INVENTION

The invention provides improved metals passivation compositions which comprise a component containing a combination of MgO—$Al_2O_3$ spinel and La/Nd oxides. These compositions are capable of providing superior metals passivation performance, especially for vanadium passivation.

In one aspect, the invention encompasses a metals passivation composition adapted for use in passivation of metals in a fluid catalytic cracking process, the composition comprising a component which contains:

15–60 pans by weight MgO,

30–60 parts by weight $Al_2O_3$, and

10–30 parts by weight rare earth compound selected from the group consisting La oxide, Nd oxide, and mixtures thereof, wherein at least a portion of the MgO and $Al_2O_3$ are present as an Mg—Al spinel phase. The La/Nd compound may optionally be present as a compound which forms the corresponding oxide in the course of use in the FCC process.

The invention further encompasses the fluid catalytic cracking catalysts including the metals passivation composition of the invention either as a particulate admixture or as an integral part of the catalyst particles. The invention further encompasses the use of the metals passivation compositions of the invention in any form in an FCC process whereby the catalyst poisoning effects of metals such as vanadium and/or nickel are diminished. These and other aspects of the invention are described in further detail below.

DETAILED DESCRIPTION OF THE INVENTION

Figure 1:
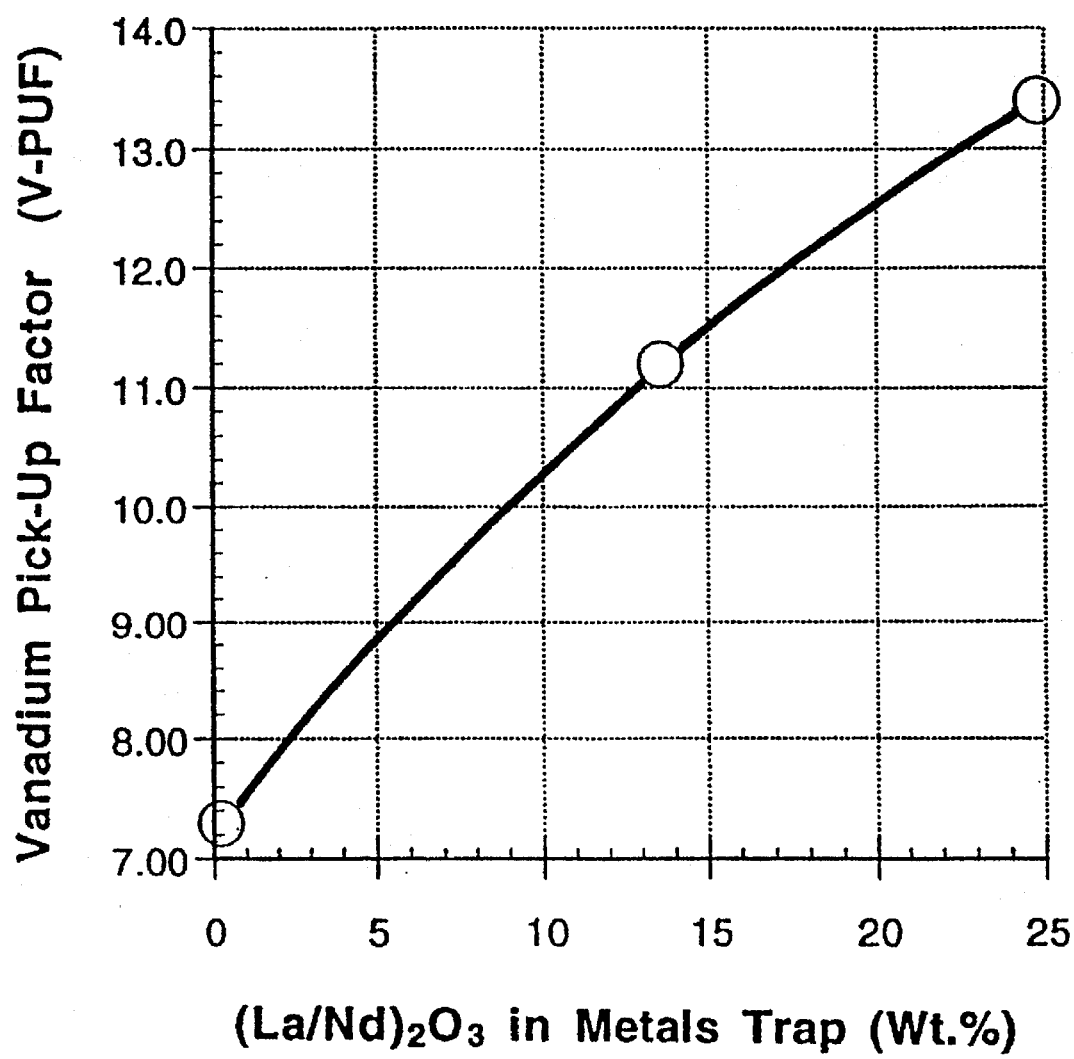
FIGURE 1 is a plot of vanadium pickup as a function of La oxide content.

The invention encompasses compositions which are especially useful for use in FCC processes involving hydrocarbon feedstocks which contain metals such as vanadium and/or nickel. The compositions of the invention are characterized by the fact that they contain a metals passivation component which contains:

15–60 parts by weight MgO,

30–60 parts by weight $Al_2O_3$, and

10–30 parts by weight rare earth compound selected from the group consisting La oxide, Nd oxide, and mixtures thereof.

wherein at least a portion of the MgO and $Al_2O_3$ is present as an Mg—Al spinel phase.

The amount of MgO present in the metals passivation component may be varied extensively within the 15–60 parts by weight range depending on the amount of free MgO desired in the product. Preferably, the metals passivation component contains about 25–50 parts by weight MgO, more preferably 35–40 parts by weight.

The amount of $Al_2O_3$ in the metals passivation component may also be varied to any level within the 30–60 parts by weight range. Preferably, the metals passivation component contains about 35–55 parts by weight alumina, more preferably 40–50 parts by weight.

The La/Nd oxide present in the metals passivation component may be varied from all La oxide to all Nd oxide. Preferably, the molar ratio of La/Nd oxides used is greater than 1, more preferably greater than 4. Sources of La and/or Nd which also contain other rare earth oxides may be used if desired. Examples of such rare earth sources are La and/or Nd rich rare earth materials such as those disclosed in U.S. Pat. No. 5,407,878, the disclosure of which is incorporated herein by reference. Referring to FIG. 1, it can be seen that the amount of La/Nd present in the composition can have a significant effect on the metals passivation ability as determined by the vanadium pick-up factor (discussed below). Thus, the metals passivation component preferably contains about 12–25 parts by weight total of La/Nd oxide, more preferably about 15–23 parts by weight.

The metals passivation component may contain minor amounts (preferably less than 10 parts by weight) of other materials which preferably do not adversely affect the metals passivation function. More preferably, however, the metals passivation component consists essentially of MgO, $Al_2O_3$, and La/Nd oxide.

Where the composition of the invention is used as an additive particle for an FCC process, the metals passivation component may be combined with fillers and/or binders to form particles suitable for use in an FCC process. Any known filler (e.g. clays, silica, alumina and other non-zeolitic oxides) may also be used in the composition. Preferably, any filler selected will not have a significant adverse affect on the performance of the metals passivation component. Any known binders may be used as long as they do not significantly adversely affect the performance of the metals passivation component. For example, binders such as alumina sols, silica sols, etc. may be used. In some cases, it may be possible to incorporate other functional components into the additive particles.

Where the metals passivation composition is used as an additive particulate (as opposed to being integrated into the FCC catalyst particles themselves), the amount of metals passivation component in the additive particles is preferably at least 50 wt. %, more preferably at least 75 wt. %. Most preferably, the additive particles consist entirely of the metals passivation component. The additive particles are preferably of a size suitable for circulation with the catalyst inventory in an FCC process. The additive particles preferably have an average particle size of about 20–200 μm. The additive particles preferably have a Davison attrition index (DI) value of about 0–45, more preferably about 0–15.

If desired, the metals passivation composition of the invention may be integrated into the FCC catalyst particles themselves. In such case, any conventional FCC catalyst particle components may be used in combination with the metals passivation composition of the invention. If integrated into the FCC catalyst particles, the metals passivation composition of the invention is preferably represents at least about 0.2 wt. % of the FCC catalyst particle, more preferably about 0.5–15 wt. %.

The metal passivation component of the compositions of the invention can be made by a variety of techniques whereby the appropriate amounts of MgO, $Al_2O_3$ and La/Nd oxide are assembled into the composition. Preferably, the metals passivation component is prepared by a method which does not involve coprecipitation.

In one preferred method, an aqueous alumina slurry is combined with an aqueous magnesia slurry and an La and/or Nd salt. The resulting mixture is then dried and calcined. If desired, the mixture can be milled before drying. The drying may be performed by any conventional means such as oven drying or spray drying, spray drying being most preferable. The calcination is preferably conducted at about 450°–750° C. in air.

The alumina used may be neat $Al_2O_3$ particles or may be a hydrated form of alumina such as pseudo-boehmite. If desired, dispersants such as tetra sodium pyrophosphate (TSPP) and peptizing agents such as formic acid may be added to the alumina slurry. Other known expedients for slurry processing may also be added to the alumina slurry assuming that do not result in any excessive adverse effect. Where the metals passivation component is to be used directly as an additive particle (i.e. without an added binder), preferably the alumina slurry is peptized by the addition of about 1–2 moles of formic acid per mole of alumina in the slurry. The amount of solids in the slurry may be varied as desired depending on the selected drying/particle formation techniques used. Typically, about 4–6 parts by weight of water are used per part of solids in the slurry.

The magnesia used may be neat MgO particles or may be any composition known to yield MgO on calcination. If desired, dispersants such as tetra sodium pyrophosphate (TSPP) or other expedients may be added to the MgO slurry. Typically, about 4–6 parts by weight of water are used per part of solids in the slurry.

The La and/or Nd salt may be any salt which can be suitably dispersed in the overall slurry and resulting composition. The salt is preferably one which yields La and/or Nd oxide either on calcination or on use of the composition in the FCC reactor/regenerator. Nitrate salts generally give the best dispersion and best metals passivation performance. The amount of La and/or Nd salt should be such that the ultimate metals passivation component produced contains the desired amount of La and/or Nd on an oxide basis.

The metals passivation composition may be used as a separate additive particle or as an integral part of an FCC catalyst particle. If used as an additive, the metals passivation component may itself be formed into particles suitable for use in an FCC process. Alternatively, the metals passivation component may be combined with binders, fillers, etc. by any conventional technique. See for example, the process described in U.S. Pat. No. 5,194,413, the disclosure of which is incorporated herein by reference.

Incorporation of the metals passivation composition directly into FCC catalyst particles may be accomplished by any known technique. Examples of suitable techniques for this purpose are disclosed in U.S. Pat. Nos. 3,957,689; 4,499,197; 4,542,118 and 4,458,023, the disclosures of which are incorporated herein by reference. In such instances, the FCC catalyst particles preferably contain a zeolite cracking catalyst component selected from the group consisting of zeolite X, zeolite Y, ultrastable zeolite Y (USY), rare earth-exchanged zeolite Y (REY), zeolite Beta, ZSM-5, and mixtures thereof.

The compositions of the invention may be used in any conventional FCC process. Typical FCC processes are conducted reaction temperatures of 450° to 650° C. with catalyst regeneration temperatures of 600° to 850° C. The amount of the composition used is preferably about 1–20 parts by weight per 100 parts of FCC catalyst used. The compositions of the invention may be used in FCC processing of any typical hydrocarbon feedstock. Preferably, the compositions of the invention are used in FCC processes involving the cracking of hydrocarbon feedstocks which contain at least 2 ppm vanadium, more preferably at least 5 to 100 ppm or more of V and/or Ni. The presence of the compositions of the invention during the FCC process passivates the adverse effects of metals such as vanadium and decreases the formation of hydrogen and coke.

The invention is further illustrated by the following examples. It should be understood that the invention is not limited to the details of these examples.

EXAMPLE 1

An alumina slurry was prepared by vigorously mixing 2498 g (1773 g on a dry basis) of CATAPAL-B alumina powder, a kind of pseudo-boehmite, and 14600 g of deionized (DI)-water containing 3.5 g of tetra-sodium-pyrophosphate (TSPP), in a Myers mixer (a high-shear mixer). The alumina in the slurry was then peptized for 10 minutes by adding 3000 g of 45 weight % formic acid to the slurry. To the resulting slurry was added a magnesia slurry which was readied by high-shear mixing 1630 g (1402 g on a dry basis) of MgO powder and 6200 g of DI-water containing 6.4 g of TSPP. After allowing the slurry to mix for 10 minutes, the slurry was two-pass Drais milled, and then was spray dried. A portion of the spray dried material was dried in a 204° C. preheated oven for 45 minutes, and then was air calcined in a 718° C. preheated muffle furnace for 45 minutes. The resulting material showed the following properties: Chemical composition (weight %): 43.2% MgO, 0.21% $La_2O_3$, 0.21% $RE_2O_3$ (total rare earth oxide), 0.40% $Na_2O$, 0.63% $SO_4$, 51.6% $Al_2O_3$ and 2.26% $SiO_2$. Physical properties: 7 DI (Davison Attrition Index), 116 m/g S.A. ($N_2$), and a powder XRD pattern revealing the presence of microcrystalline $MgAl_2O_4$ and $(MgO)_2Al_2O_3$ spinel, and some free MgO.

EXAMPLE 2

A slurry of peptized alumina was prepared in exactly the same manner as in Example 1, using 1900 g (1300 g on a dry basis) of CATAPAL-B alumina powder, 9500 g of DI-water, 2.7 g of TSPP, and 2016 g of 45% formic acid solution. In the meantime, a magnesia slurry was readied by high-shear mixing 1208.5 g (1051.4 g on a dry basis) of MgO powder and 3519 g of DI-water containing 5 g of TSPP. The magnesia slurry was added to the above-peptized alumina slurry, and the batch was allowed to mix for 10 minutes. To the resulting slurry was added 1234.4 g of La/Nd-nitrate solution bearing 306.1 g of $La_2O_3$ and 32.1 g of $Nd_2O_3$. After mixing the batch for 5 minutes, the slurry was one-pass Drais milled, and then was spray dried. A portion of the spray dried material was air calcined in a muffle furnace, ramping up to 718° C. and allowing 45-minute soak at this temperature. The resulting material had the following properties: Chemical composition (weight %): 38.5% MgO, 12.67% $La_2O_3$, 0.96% $Nd_2O_3$, 13.70% $RE_2O_3$, 0.21% $Na_2O$, 0.45% $SO_4$, 45.3% $Al_2O_3$, and 0.32% $SiO_2$. Physical properties: 6 DI, 111 $m^2/g$ S.A. ($N_2$), and a powder XRD pattern showing the presence of microcrystalline $(MgO)_2Al_2O_3$ spinel, microcrystalline $La_2O_3$, and some free MgO.

EXAMPLE 3

A slurry of peptized alumina was prepared in exactly the same manner as in Example 1, using 1629 g (1140 g on a dry basis) of CATAPAL-B alumina powder, 8145 g of DI-water containing 2.7 g of TSPP, and 2016 g of 45% formic acid solution. To this was added a magnesia slurry which was readied in the same manner in Example 2, using 1035.8 g (901 g on a dry basis) of MgO powder and 3107 g of DI-water containing 5 g of TSPP. After allowing the batch to mix for 10 minutes, 2469 g of La/Nd-nitrate solution bearing 611.7 g of $La_2O_3$ and 64.3 g of $Nd_2O_3$ was added to the batch. The slurry was mixed for 5 minutes, one-pass milled, and spray dried. The resulting material had the following properties: Chemical composition (weight %): 33.7% MgO, 22.15% $La_2O_3$, 2.28% $Nd_2O_3$, 24.43% $RE_2O_3$, 0.13% $Na_2O$, 0.45% $SO_4$, 41.1% $Al_2O_3$, and 0.32% $SiO_2$. Physical properties: 9 DI, 88 $m^2/g$ S.A. ($N_2$), and a powder XRD pattern showing the presence of microcrystalline $(MgO)_2Al_2O_3$ spinel, microcrystalline $La_2O_3$, and some free MgO.

EXAMPLE 4

In order to demonstrate the superiority of the materials of this invention for trapping vanadium in FCC operation, the following study was carried out: a 100 g (on a dry basis) blend was prepared by mixing one of the traps prepared above with an ORION® family of GRACE-Davison FCC catalyst at a weight ratio of 1 part trap to 9 parts FCC catalyst. An unblended, 100 g of FCC catalyst was taken as a base case. Each sample spread over a dish in a shallow bed was then treated according to the following protocol: Heated in a muffle furnace to 204° C. air, allowed to soak for one hour at this temperature; raised to 503° C., allowed to soak for 3 hours at this temperature; and then allowed to cool to room temperature; impregnated with a desired level—5000 ppm in this study—of vanadium naphthenate in pentane to completely and uniformly cover all particles with vanadium; allowed pentane to evaporate away in muffle furnace at room temperature; heated to 204° C. and held for one hour; raised to 593° C., and allowed to soak at this temperature for 3 hours; and then allowed to cool to room temperature; charged into an Inconel fluid-bed reactor; allowed the bed temperature to reach 771° C. in flowing nitrogen over a period of approximately 3 hours; and then subjected to 20-hour/771° C. cyclic-propylene-steaming (CPS), an accelerated catalyst deactivation protocol involving redox cycles (40 minutes/cycle) and 50 weight % steam (10 g $H_2O$/hour) throughout each cycle as follows: 10 minutes of nitrogen (137 ml/min.), 10 minutes of nitrogen containing 5 vol. % propylene, 10 minutes of nitrogen, and 10 minutes of air containing 4000 ppm $SO_2$ finally, the reactor was allowed to cool to room temperature in flowing nitrogen for discharging the sample.

In the course of the above deactivation treatment, FCC catalysts are attacked by vanadium. In the presence of a metals trap, however, the degree of vanadium attack on FCC catalysts can be significantly lessened as a result of vanadium capture by the metals trap. In order to prove this, each of the above deactivated samples was divided into two fractions–approximately 10 weight % of sink (metals trap) and approximately 90 weight % of float (FCC catalyst) fractions—by means of so-called "sink-float" or density separation, using tetrabromoethane having a density of 2.96 g/ml, tetrachloroethane having a density of 1.58 g/ml, and a centrifuge. All the samples, before and after the sink-float separation, were analyzed by using an Inductively Coupled Plasma Spectrometer. FIG. 1 shows the so-called vanadium pick-up factor (V-PUF) data for each of the compositions of examples 1–3 as a function of La/Nd oxide content in the metals trap composition. The V-PUF, defined by the ratio of vanadium concentration in the trap (i.e., in the sink fraction) to that in the FCC catalyst (i.e., in the float fraction), is a measure of vanadium trapping efficiency.

What is claimed is:

1. A process for fluid catalytic cracking a hydrocarbon feedstock containing at least 2 ppm vanadium wherein (a) an inventory of catalyst particles is repeatedly circulated between a hydrocarbon cracking zone and a catalyst regeneration zone, (b) said feedstock is contacted with said catalyst particles in said hydrocarbon cracking zone whereby said feedstock is cracked, and (c) said catalyst particles are regenerated in said regeneration zone, wherein the improvement comprises adding particles to said catalyst inventory, which added particles contain a metals passivation component containing:

15–60 parts by weight MgO,

30–60 parts by weight $Al_2O_3$, and

10–30 parts by weight rare earth compound selected from the group consisting of La oxide, Nd oxide, and mixtures thereof, wherein at least a portion of said MgO and $Al_2O_3$ in said added particles is present as an Mg—Al oxide spinel phase prior to said addition.

2. The process of claim 1 wherein said added particles further contain a binder.

3. The process of claim 1 wherein said added particles consist essentially of:

15–60 parts by weight MgO,

30–60 parts by weight $Al_2O_3$, and

10–30 parts by weight rare earth compound selected from the group consisting of La oxide, Nd oxide, and mixtures thereof.

4. The process of claim 1 wherein substantially all of said MgO and $Al_2O_3$ is in the form of a magnesium aluminate spinel.

5. The process of claim 1 wherein said metals passivation component contains 15–25 parts by weight of said rare earth compound.

6. The process of claim 1 wherein said rare earth compound consists essentially of lanthanum oxide.

7. The process of claim 1 wherein said added particles contain at least 25 wt. % of said component.

8. The process of claim 7 wherein said added particles contain at least 50% of said metals passivation component.

9. The process of claim 1 wherein said additive particles have a Davison attrition index of about 15 or less.

10. The process of claim 1 wherein said additive particles further contain a zeolite cracking catalyst component.

11. The process of claim 10 wherein said additive particles contain about 0.5–15 wt. % of said metals passivation component.

12. The process of claim 10 wherein said zeolite is selected from the group consisting of zeolite X, zeolite Y, ultrastable zeolite Y (USY), rare earth-exchanged zeolite Y (REY), zeolite Beta, ZSM-5, and mixtures thereof.

13. The process of claim 1 wherein said hydrocarbon feedstock contains at least 5 ppm vanadium.

14. The process of claim 1 wherein said hydrocarbons are cracked in said cracking zone at a temperature of about 450°–650° C. and said catalyst is regenerated in said regeneration zone at a temperature of about 600°–850° C.

* * * * *